United States Patent
Lee

(10) Patent No.: US 9,560,472 B2
(45) Date of Patent: Jan. 31, 2017

(54) APPARATUS AND METHOD FOR SHARING DATA WITH AN ELECTRONIC DEVICE

(71) Applicant: Samsung Electronics Co., Ltd., Gyeonggi-do (KR)

(72) Inventor: Jin-Woo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 14/229,103

(22) Filed: Mar. 28, 2014

(65) Prior Publication Data

US 2014/0295763 A1    Oct. 2, 2014

(30) Foreign Application Priority Data

Mar. 28, 2013    (KR) .................. 10-2013-0033453

(51) Int. Cl.
*H04B 5/00*    (2006.01)
*H04W 4/00*    (2009.01)

(52) U.S. Cl.
CPC .................... *H04W 4/008* (2013.01)

(58) Field of Classification Search
CPC ................ H04B 5/02; H04W 4/008
USPC ............................... 455/41.1, 41.2
See application file for complete search history.

(56) References Cited

U.S. PATENT DOCUMENTS

| | | | | |
|---|---|---|---|---|
| 8,335,493 | B2* | 12/2012 | Angelhag | H04L 67/16 455/41.1 |
| 2008/0208925 | A1* | 8/2008 | Shum | H04W 12/06 |
| 2009/0191811 | A1* | 7/2009 | Griffin | G06Q 20/10 455/41.1 |
| 2010/0078471 | A1* | 4/2010 | Lin | G06Q 40/02 235/379 |
| 2010/0078475 | A1* | 4/2010 | Lin | B64F 1/366 235/380 |
| 2011/0143775 | A1* | 6/2011 | Liu | G06F 17/30241 455/456.3 |
| 2011/0270755 | A1* | 11/2011 | Pinski | G06Q 20/04 705/44 |
| 2014/0167929 | A1* | 6/2014 | Shim | G08C 17/02 340/12.5 |

FOREIGN PATENT DOCUMENTS

EP    2302884    3/2011
KR    20120078333    7/2012

* cited by examiner

*Primary Examiner* — April G Gonzales
(74) *Attorney, Agent, or Firm* — The Farrell Law Firm, P.C.

(57) ABSTRACT

A method and apparatus for sharing data with another electronic device are provided. The apparatus includes a processor, and a memory for storing program instructions. The program instructions are configured to have the processor sense a tagging with the another electronic device; determine a service level of the another electronic device; identify shared data corresponding to the determined service level of the another electronic device; and transmit the identified shared data to the another electronic device.

19 Claims, 9 Drawing Sheets

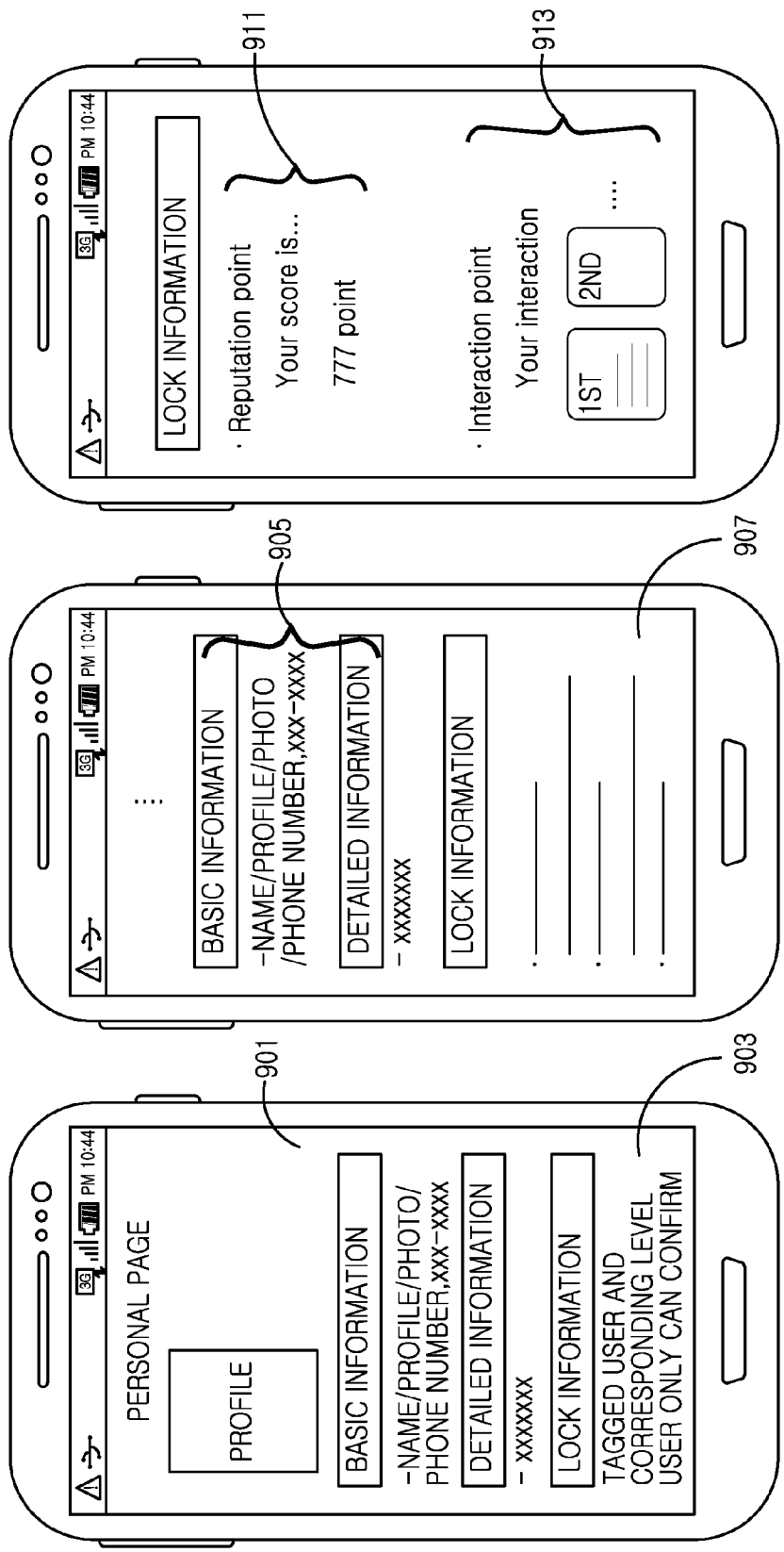

APPARATUS AND METHOD FOR SHARING DATA WITH AN ELECTRONIC DEVICE

PRIORITY

This application claims priority under 35 U.S.C. §119(a) to Korean Patent Application Serial No. 10-2013-0033453, which was filed in the Korean Intellectual Property Office on Mar. 28, 2013, the content of which is incorporated herein by reference.

BACKGROUND OF THE INVENTION

1. Field of the Invention

The present invention relates generally to a method and apparatus for sharing data with another electronic device.

2. Description of the Related Art

An electronic device can share data with another electronic device using a local area communication function. For example, the electronic device can connect with the another electronic device using Wireless Fidelity (WiFi), Near Field Communication (NFC), Bluetooth, etc., and provide stored data to the connected another electronic device.

Generally, after the electronic device connects with the another electronic device, a user of the electronic device selects data to be provided to the another electronic device. However, this selection process is normally performed by the user directly performing a menu selection process. As a result, the user has to perform multiple commands in order to share data, which can be inconvenient to the user.

SUMMARY OF THE INVENTION

An aspect of the present invention is to substantially solve at least the above-described problems and/or disadvantages and to provide at least the advantages below.

Accordingly, aspects of the present invention include providing an apparatus and a method for sharing data with another electronic device using a tagging method.

Additional aspects of the present invention include providing an apparatus and a method for determining a service level of a tagged another electronic device.

Additional aspects of the present invention include providing an apparatus and a method for sharing data satisfying a service level of a tagged another electronic device.

In accordance with an aspect of the present invention, an electronic device is provided, which includes a processor, and a memory for storing program instructions. The program instructions are configured to have the processor sense a tagging with another electronic device; determine a service level of the another electronic device; identify shared data corresponding to the determined service level of the another electronic device; and transmit the identified shared data to the another electronic device.

In accordance with another aspect of the present invention, a method is provided for sharing data by an electronic device. The method includes sensing a tagging of the electronic device with another electronic device; determining a service level of the another electronic device; identifying shared data corresponding to the determined service level of the another electronic device; and transmitting the identified shared data to the another electronic device.

In accordance with another aspect of the present invention, a non-transitory computer-readable storage medium is provided for recording a program thereon. When the program is executed by an electronic device, it controls the electronic device to sense a tagging of the electronic device with another electronic device; determine a service level of the another electronic device; identify shared data corresponding to the determined service level of the another electronic device; and transmit the identified shared data to the another electronic device.

BRIEF DESCRIPTION OF THE DRAWINGS

The above and other aspects, features, and advantages of certain embodiments of the present invention will become more apparent from the following detailed description when taken in conjunction with the accompanying drawings, in which:

FIGS. 9A, 9B and 9C illustrate examples of screens that are displayed in an electronic device while setting a level of shared data according to an embodiment of the present invention.

DETAILED DESCRIPTION OF EMBODIMENTS OF THE INVENTION

Figure 1:
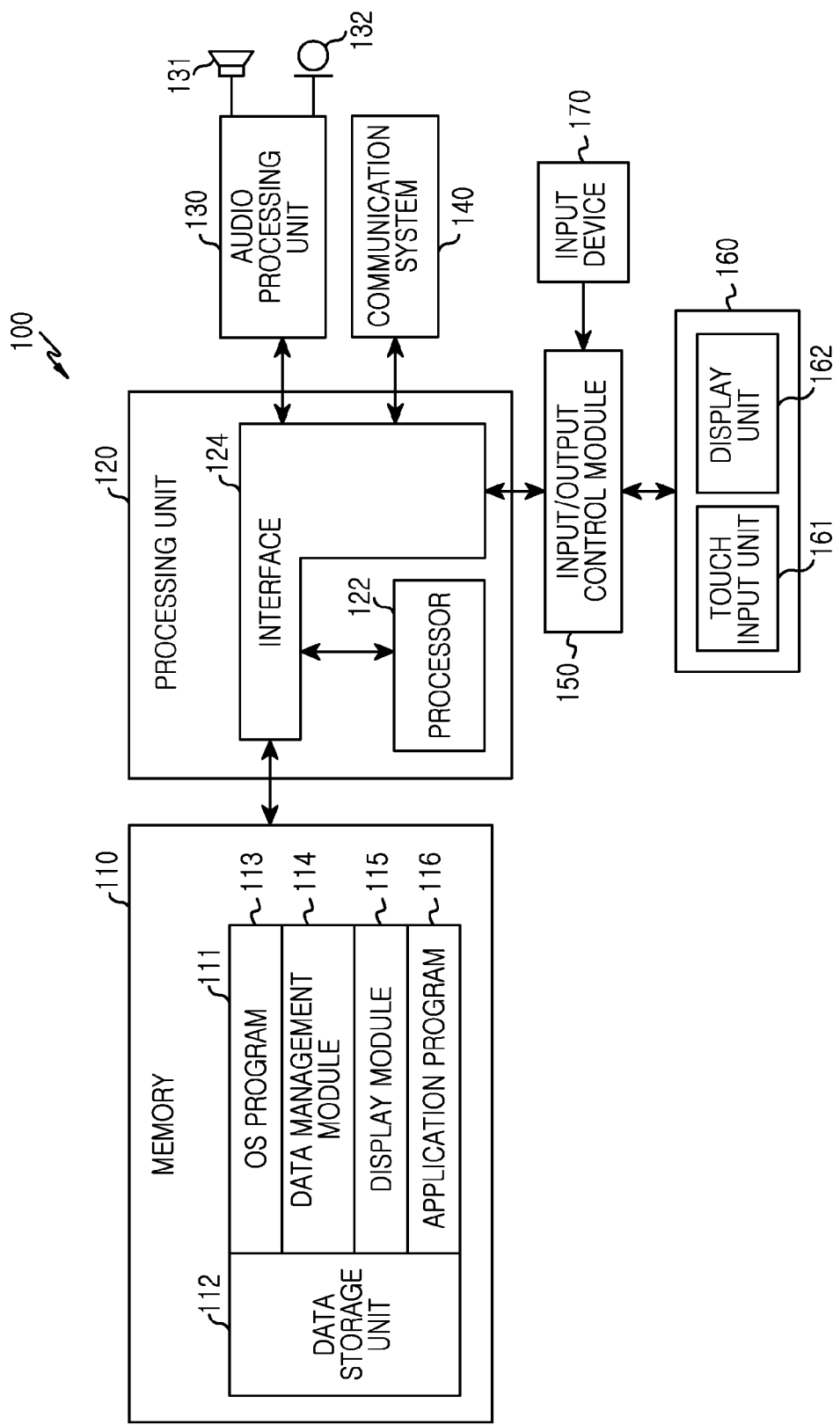
FIG. 1 is a block diagram illustrating an electronic device according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, an apparatus and a method are provided for sharing data with another electronic device using a tagging method.

Herein, examples of an electronic device being tagged by (or tagging) another electronic device include but are not limited to when the electronic device contacts with the another electronic device, e.g., the two electronic devices are bumped together, or when the electronic device is position within a predetermined distance to the another electronic device.

Additionally, for simplicity, the another device will mostly be referred to herein as the tagged device, after a tagging operation, even though the another device may also perform the tagging.

Further, after the tagging, the electronic device can perform a predefined operation with the tagged (or tagging) another electronic device. Examples of the predefined operation performed after tagging include but are not limited to sharing data, data backup, service level updates, etc.

Further, the electronic device can determine a service level of a tagged electronic device, and share data satisfying the service level with the tagged electronic device. For example, the electronic device can determine the service level based on tagging information (e.g., a tagging frequency, a tagging period, etc.) about a tagging object. That is, the electronic device can grant a high service level to another electronic device having a high tagging frequency.

Additionally, the electronic device can perform predefined operations, such as data backups, service level updates, etc., using a tagging method or a service level. Further, the electronic device can share personal basic information (e.g., a name, a profile photo, an account, a phone number, etc.), multimedia data (e.g., image data, video data, etc.), digital content, etc., with another electronic device using the tagging method or the service level.

For example, the electronic device may be a portable electronic device, such as a portable terminal, a mobile terminal, a media player, a tablet computer, a handheld computer, a Personal Digital Assistant (PDA), or any portable electronic device including a device having a combination of two or more functions among these devices. Additionally, the electronic device may support local area communication such as Bluetooth, WiFi, NFC, etc.

FIG. 1 is a block diagram illustrating an electronic device according to an embodiment of the present invention.

Referring to FIG. 1, the electronic device 100 includes a memory 110, a processor unit 120, an audio processing unit 130, a communication system 140, an input/output control module 150, a touch screen 160, and an input device 170. Additionally, the electronic device 100 may also include a plurality of the above-identified elements. For example, the electronic device 100 may include a plurality of memories 110 or a plurality of communication systems 140.

The memory 110 includes a program storage unit 111 storing a program for controlling an operation of the electronic device 100 and a data storage unit 112 storing data generated during program execution. For example, the data storage unit 112 stores various updatable data such as phone book data, and sent and received messages, and stores shared data, i.e., data to be shared with another electronic device. For example, the shared data that is stored in the data storage unit 112 may be data having a sharing level set thereto.

Further, the data storage unit 112 may store a service level of a tagged 2nd electronic device. For example, the service level is set and updated according to a number of times another electronic device is tagged, a tagging frequency of another device, etc. The service level may be determined by the electronic device 100 or a server that manages shared data.

The data storage unit 112 may also store information about an operation to be performed after tagging another electronic device.

In accordance with an embodiment of the present invention, the electronic device 100 performs a data sharing process using a tagging method. Additionally, the electronic device 100 may perform other operations, such as data backups, service level updates, etc. Accordingly, the data storage unit 112 may store information about an operation to be carried out with the another electronic device using a tagging operation.

The program storage unit 111 includes an Operating System (OS) program 113, a data management module 114, a display module 115, and at least one application program 116. Herein, the module included in the program storage unit 111 is a set of instructions, which may be expressed as an instruction set.

The OS program 113 may include various software constituent elements for controlling general system operations. For example, the controlling of the general system operations can represent memory management or control, storage hardware (device) control or management, power control or management, etc. The OS program 113 may also perform functions for communicating between various hardware (devices) and program constituent elements (modules).

The data management module 114 may include various software constituent elements for sharing data with a tagged electronic device.

The data management module 114 may manage a connection with a tagged electronic device. For example, if a tagging operation with another electronic device is sensed, the data management module 114 connects with the tagged electronic device using a communication method for communicating with the tagged electronic device.

Further, the data management module 114 manages data to be shared with a tagged electronic device.

After determining a service level of a tagged electronic device, the data management module 114 identifies shared data, which is allowed to be provided to the tagged electronic device. For example, after determining the service level of the tagged electronic device, the data management module 114 may sort shared data corresponding to the service level among a plurality of shared data.

As another example, after determining the service level of the tagged electronic device, the data management module 114 can confirm the content of data allowed for the tagged electronic device among the content of data.

The data management module 114 transmits shared data to the tagged electronic device. More specifically, the data management module 114 analyzes data to be shared, and transmits the data to the tagged electronic device, directly or via a server that manages the shared data.

For example, after identifying a size of data to be shared with the tagged electronic device, the importance of the data, etc., the data management module 114 can determine a data transmission method suitable for the shared data based on the identified information.

The display module 115 may include various software constituent elements for providing and displaying a graphic on the touch screen 160. Examples of graphics include text, a web page, an icon, a digital image, a video, an animation, etc.

Further, the display module 115 may include various software constituent elements related to a user interface.

The display module 115 may also display particular indications when connecting with another electronic device in a tagging method. For example, if a tagging operation with another electronic device is sensed, the display module 115 can display a menu for selecting a communication method to be used. The display module 115 may also display a service level of the tagged electronic device. For example, the displayed service level, which is an authority level of the tagged electronic device, may be a level determined based on the number of tagging, a tagging frequency, etc. The service level may be provided from a server that manages data.

Further, the display module 115 may display particular indications when sharing data with the tagged electronic device. For example, the display module 115 may display an indication as to whether the shared data is transmitted directly to the tagged electronic device or whether the shared data is transmitted to the tagged electronic device via the server that manages the shared data.

Further, the display module 115 may display information about shared data and a level set to the shared data.

The application program 116 may include software constituent elements for at least one application program installed in the electronic device 100 and a module for sharing data using a tagging method. For example, an application may connect the electronic device 100 with another electronic device using a tagging method and share data with the tagged electronic device using a service level of the tagged electronic device.

The program included in the program storage unit 111 may be operated by a hardware configuration.

The processor unit 120 includes a processor 122 and an interface 124. Although illustrated separately, the processor 122 or the interface 124 may also be integrated as an integrated circuit.

The interface 124 is utilized as a memory interface controlling the access of the processor 122 and the memory 110. Further, the interface 124 may be utilized as a peripheral interface for controlling the connection of the processor 122 with an input/output peripheral device of the electronic device 100.

By using a software program, the processor 122 can control the electronic device 100 to connect with another electronic device using a tagging method and share data with the tagged electronic device using a service level of the tagged electronic device.

More specifically, the processor 122 executes at least one program stored in the memory 110 and performs a function corresponding to the executed program. For example, the processor 122 performs a function for connecting the electronic device 100 with another electronic device using a tagging method and sharing data with the tagged electronic device using a service level of the tagged electronic device.

A function of the electronic device 100 sharing data using a tagging method can be performed using software such as the program stored in the memory 100 or hardware such as the processor 122.

The audio processing unit 130 provides an audio interface between a user and the electronic device 100 through a speaker 131 and/or a microphone 132.

The communication system 140 performs a communication function for voice communication or data communication of the electronic device 100. For example, the communication system 140 may include a plurality of communication sub modules supporting different communication networks, such as a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, an NFC network, etc.

Using the communication system 140, the electronic device 100 communicates with another electronic device connected in a tagging method or with a server that manages shared data.

The input/output control unit 150 provides an interface between a user and the input/output device 170 or the touch screen 160.

The touch screen 160 includes a touch input unit 161 and a display unit 162.

The touch input unit 161 provides touch information sensed through a touch panel to the processor unit 120 through the input/output control unit 150. For example, the touch input unit 161 changes the touch information into an instruction structure such as touch_down, touch_move, touch_up, etc., and provides the instruction structure to the processor unit 120. The touch input unit 161 selects a communication method for connecting with a tagged electronic device, and generates input data for setting a service level of the tagged electronic device.

The display unit 162 displays status information of the electronic device 100, characters input by a user, a moving picture, a still picture, etc. For example, the display unit 162 may also display different indicators during a process for connecting the electronic device 100 with a tagged electronic device and a process of data sharing with the tagged electronic device.

Further, the display unit 162 may display a screen for a user to select a communication method for connecting with a tagged electronic device, and a screen for the user set a service level of the tagged electronic device.

The input device 170 provides input data generated by a user selection to the processor unit 120 through the input/output control unit 150. For example, the input device 170 includes a control button for control of the electronic device 100. The input device 170 may be used by the user to select a communication method for connecting with a tagged electronic device, and generate input data for setting a service level of the tagged electronic device.

Although not illustrated, the electronic device 100 may also include constituent elements for providing additional functionality, such as a broadcast reception module for broadcast reception, a digital sound playing module such as an MPEG Audio Layer-3 (MP3) module, a local area wireless communication module for local area wireless communication, an image sensor for image data acquisition, a proximity sensor module for proximity sensing, and software for operations thereof.

Figure 2:
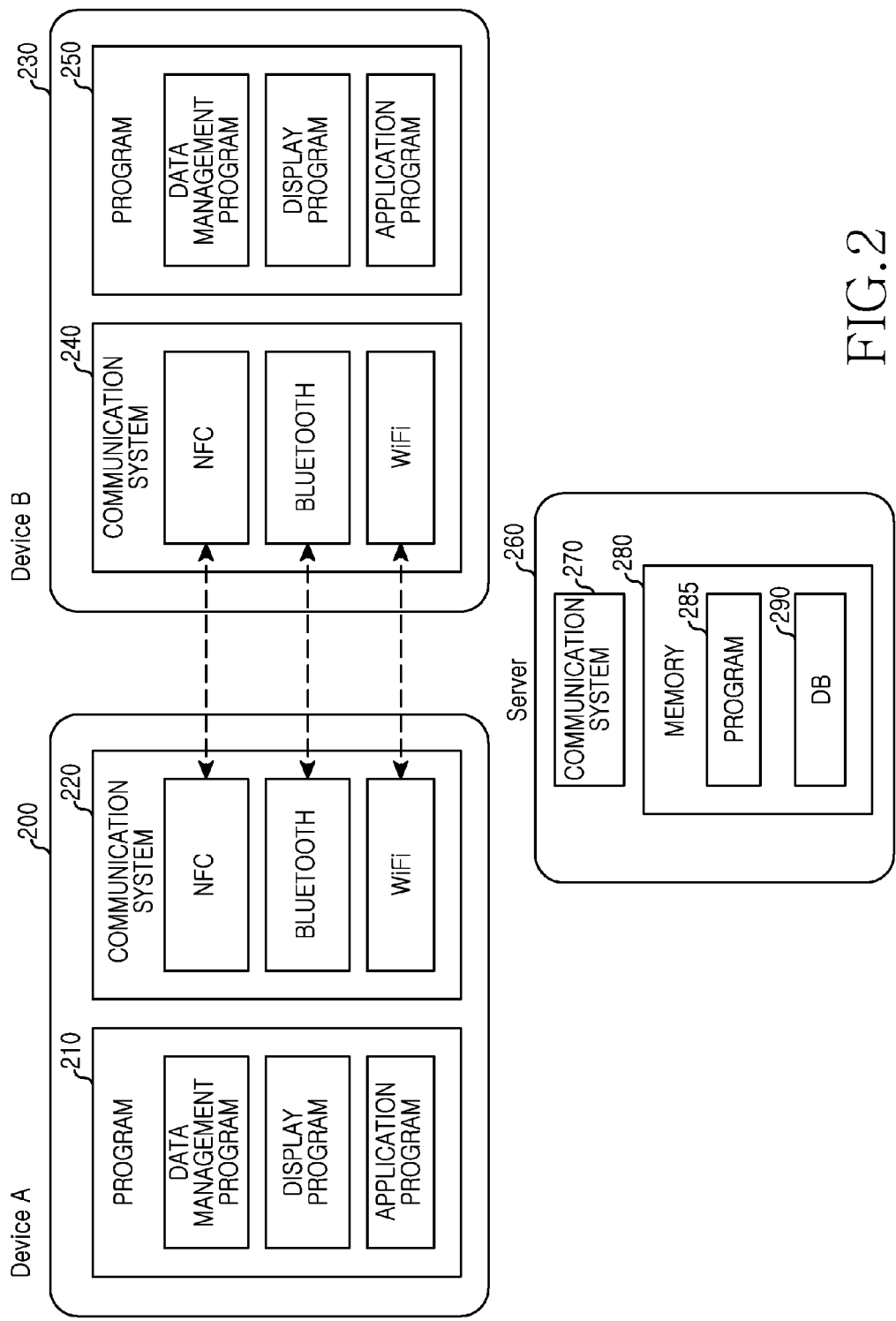
FIG. 2 illustrates a data sharing system according to an embodiment of the present invention.

FIG. 2 illustrates a data sharing system according to an embodiment of the present invention.

Referring to FIG. 2, the data sharing system includes an electronic device 200, another electronic device 230 sharing data in communication with the electronic device 200, and a server 260 that manages shared data.

The electronic device 200 or the another electronic device 230 may share data with each other using local area communication. The electronic device 200 and the another electronic device 230 include communication systems 220 and 240, such as NFC, Bluetooth, WiFi, etc., and perform communication functions using a mobile communication network.

The electronic device 200 and the another electronic device 230 can sense a tagging operation and perform a communication function in a corresponding communication method.

Further, the electronic device 200 can update a service level of the another electronic device 230, when tagged (that is, the tagged electronic device 230). The service level is an authority level of the tagged electronic device 230. For example, the service level is a sharing authority level of the tagged electronic device 230.

To share data using the tagging method, the electronic device 200 includes a plurality of programs 210, e.g., a data management program, a display program, an application program, etc. The data management program may include various software constituent elements for sharing data with the tagged electronic device 230. If a tagging operation with the another electronic device 230 is sensed, the data management program connects the electronic device 200 with the tagged electronic device 230 using any one of the aforementioned communication systems.

After determining a service level of the tagged electronic device 230, the data management program identifies shared data corresponding to the service level among shared data, and transmits the confirmed shared data to the tagged electronic device 230. More specifically, the data management program analyzes the data to be shared, and transmits the data to the tagged electronic device 230, either directly or via the server 260 that manages the shared data.

The display program display various indications when connecting with the another electronic device 230 in the tagging method, data sharing with the tagged electronic device 230, etc.

The application program controls the data management program and the display program to share data with the tagged electronic device 230 in the tagging method.

The another electronic device 230 may also tag the electronic device 200 and includes programs 250, which operate in the same fashion as programs 210, as described above.

As indicated above, the server 260 manages the shared data and includes a communication system 270 for communicating with the electronic device 200 and/or the another electronic device 230.

The server 260 may be operated by a program 285 stored in a memory 280, and can receive shared data from the electronic device 200 and provide the shared data to the another electronic device 230. Further, the server 260 may receive shared data from the another electronic device 230 and provide the shared data to the electronic device 200.

Further, the server 260 can receive tagging information about a counterpart device from the electronic device 200 or the another electronic device 230, and determine a service level of the counterpart device.

For example, the server 260 receives tagging information about the tagged electronic device 230 from the electronic device 200, determines a service level of the tagged electronic device 230, and provides the determined service level to the electronic device 200. Further, the server 260 determines the service level and stores the determined service level in a DataBase (DB) 290. When receiving a service level request from the electronic device 200 or the another electronic device 230, the server 260 may determines a new service level based on the previously stored service level.

Figure 3:
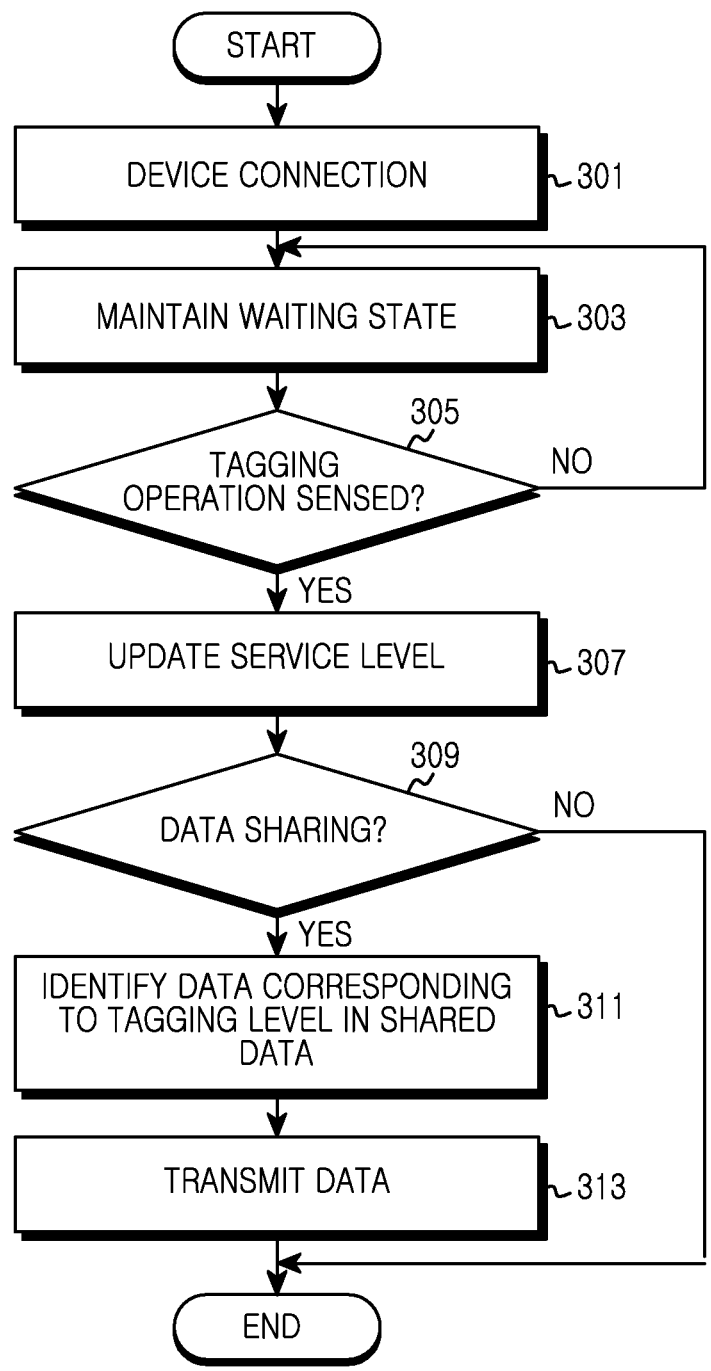
FIG. 3 is a flowchart illustrating a process for transmitting data by an electronic device according to an embodiment of the present invention.

FIG. 3 is a flowchart illustrating a process for transmitting data by an electronic device according to an embodiment of the present invention.

Referring to FIG. 3, the electronic device performs a device connection process in step 301. Specifically, the electronic device connects with another electronic device, e.g., using local area communication such as Bluetooth, WiFi, NFC, etc.

In step 303, the electronic device operates in a waiting state, e.g., refrains from performing operations for sharing data, data backup, service level updates, etc., until a tagging operation with another electronic device is sensed.

In step 305, the electronic device senses a tagging operation with the another electronic device, and may determine an execution time for a predefined operation. For example, the electronic device connects to the another electronic device and then senses a tagging operation for performing a predefined operation.

In step 307, the electronic device updates a service level of the tagged electronic device. For example, the electronic device determines the service level of the tagged electronic device using tagging information (e.g., a tagging frequency, a tagging period, etc.) about the tagged electronic device.

The electronic device may also grant a weight to a frequently tagged electronic device to determine the service level. That is, the electronic device grants a high authority to a friendly user in that frequently tagged electronic device users generally have better relationships with each other.

As another example, the electronic device may grant a weight to a type of user to a tagged electronic device to determine the service level. The types of users may include an entertainer, a sports star, a politician, etc., which are distinguishable from general users.

As another example, the electronic device can grant a weight using a tagging position to determine the service level. The electronic device can determine the service level by granting a higher weight when the electronic device is tagged in a predefined position than when the electronic device is tagged in other positions.

After updating the service level of the tagged 2nd electronic device, the electronic device identifies data satisfying the updated service level of the tagged electronic device among shared data in step 311.

In step 313, the electronic device shares the identified data with the tagged electronic device.

Additionally, after updating the service level of the tagged 2nd electronic device, the electronic device determines if a request for the electronic device to perform the predefined operation is sensed in step 309. For example, the electronic device detects a key input corresponding to the request for the electronic device to perform the predefined operation. As another example, the electronic device detects a gesture corresponding to the request for the electronic device to perform the predefined operation.

For example, the predefined operation, which is performed using local area communication, includes shared data transmission, data backup, service level update, etc. In the description, the shared data transmission is described. That is, the electronic device can share the identified data with the tagged electronic device after updating the service level or sensing the request.

Accordingly, in the process illustrated in FIG. 3, the electronic device can define the shared data according to the service level, identify a service level of a tagged electronic device, and then share data corresponding to the identified service level with the tagged electronic device.

Figure 4:
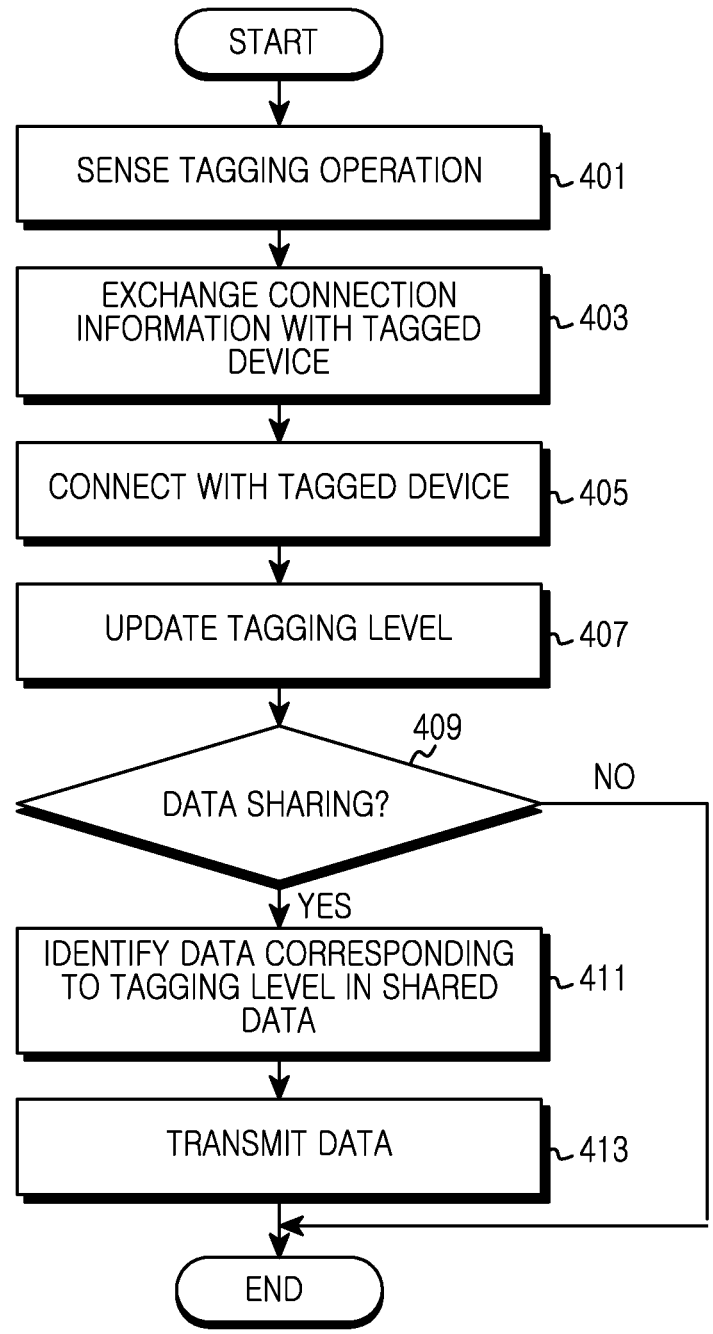
FIG. 4 is a flowchart illustrating a process for transmitting data in an electronic device according to an embodiment of the present invention.

FIG. 4 is a flowchart illustrating a process for transmitting data in an electronic device according to an embodiment of the present invention.

Referring to FIG. 4, in step 401, the electronic device senses a tagging operation with another electronic device, i.e., the tagged electronic device. For example, the electronic device senses an impact caused by tagging to sense the tagging operation or senses the access of the another electronic device to sense the tagging operation.

For example, the electronic device may include an NFC reader capable of recognizing an NFC tag. In this case, by recognizing the another electronic device operating as the NFC tag, the electronic device can sense the tagging operation to the another electronic device.

In step 403, the electronic device exchanges connection information to the tagged electronic device. For example, the electronic device sends identification information requests to peripheral electronic devices, and then confirms the tagged electronic device based on responses to the identification information requests. That is, when receiving responses to the identification information requests from a plurality of electronic devices, the electronic device can determine another electronic device having sent a response satisfying the condition of a reception time, a reception signal intensity, etc., among the plurality of electronic devices, as the tagged electronic device.

Further, the electronic device may provide information about a connectable communication method to the tagged electronic device using an identifier included in the response received from the tagged electronic device, and receive a response to the information about the connectable communication method from the tagged electronic device. Based on the foregoing, the electronic device may match a communication method with the tagged electronic device.

As another example, when recognizing the NFC tag to sense the tagging operation to the tagged electronic device, the electronic device exchanges connection information with the tagged electronic device.

Further, when sensing the tagging operation to the another electronic device, the electronic device in initially operating in an NFC reader mode can change an operation mode into a data transmission mode. In this case, the tagged electronic device operating as the NFC tag may also change an operation mode into a data transmission mode.

In operation 405, the electronic device connects with the tagged electronic device, and in step 407, the electronic device updates a service level of the tagged electronic device connected by the tagging operation.

For example, the electronic device determines the service level of the tagged electronic device using tagging information (e.g., a tagging frequency, a tagging period and the like) about the tagged electronic device, as described above in relation to FIG. 3.

In step 409, the electronic device determines if a request for the electronic device to perform a predefined operation is sensed. As described above, the predefined operation is performed using local area communication, and may include shared data transmission, data backup, a service level update, etc. In the following description, the shared data transmission is described.

When the electronic device senses a request for data sharing in step 409, the electronic device identifies data satisfying the service level of the tagged electronic device among shared data in step 411 and shares the identified data with the tagged electronic device in step 413.

As described above, an electronic device in accordance with an embodiment of the present invention can define shared data according to a service level, identify a service level of a tagged electronic device, and share data corresponding to the identified service level with the tagged electronic device.

Figure 5:
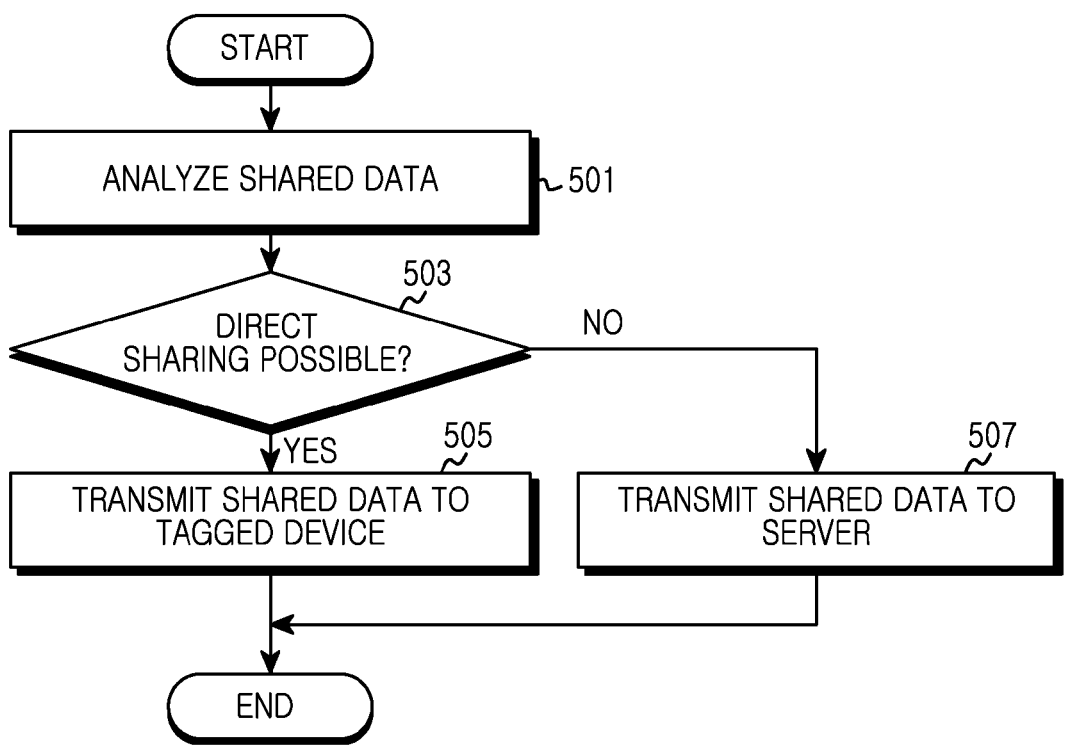
FIG. 5 is a flowchart illustrating a process of transmitting data to a tagged electronic device according to an embodiment of the present invention.

FIG. 5 is a flowchart illustrating a process of transmitting data to a tagged electronic device according to an embodiment of the present invention.

Referring to FIG. 5, in step 501, the electronic device analyzes shared data to be transmitted to a tagged electronic device. For example, the electronic device can analyze the size of the shared data, the importance of the shared data, etc. By analyzing the shared data, the electronic device can determine a data transmission method.

In operation 503, the electronic device determines the data transmission method using the shared data analysis result. More specifically, using the shared data analysis result, the electronic device determines whether to transmit the data directly to the tagged electronic device or whether to transmit the data to the tagged electronic device via a server managing data. For example, if the size of the shared data is small or the importance of the shared data is low, the electronic device can transmit the shared data directly to the tagged electronic device using a connected communication method. Conversely, if the size of the shared data is large or the importance of the shared data is high, the electronic device can register the shared data to the server, and the tagged electronic device can access the server to receive the shared data therefrom.

In step 505, the electronic device transmits the shared data directly to the tagged electronic device.

Alternatively, in step 507, the electronic device transmits the shared data to the tagged electronic device via the server.

FIGS. 6A, 6B, 6C and 6D are diagrams illustrating an electronic device connecting with another electronic device according to an embodiment of the present invention.

Figure 6A:
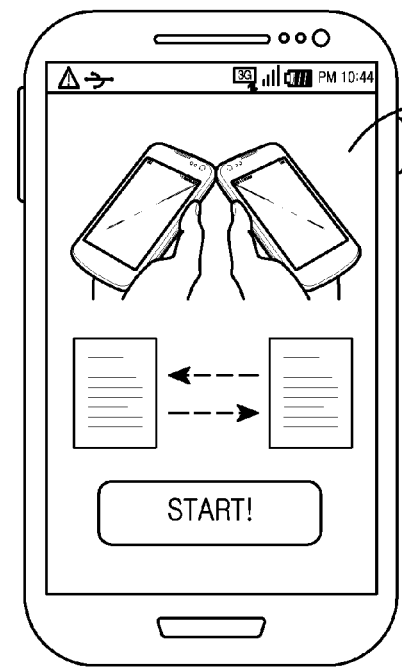
FIGS. 6A, 6B, 6C and 6D are diagrams illustrating an electronic device connecting with another electronic device according to an embodiment of the present invention.

As illustrated in FIG. 6A, using an application, the electronic device can connect with another electronic device using a tagging method. Specifically, FIG. 6A illustrates an execution screen 601 of an application providing a data sharing function according to an embodiment of the present invention.

The electronic device can connect with another electronic device using local area communication such as Bluetooth, WiFi, NFC, etc.

Figure 6B:
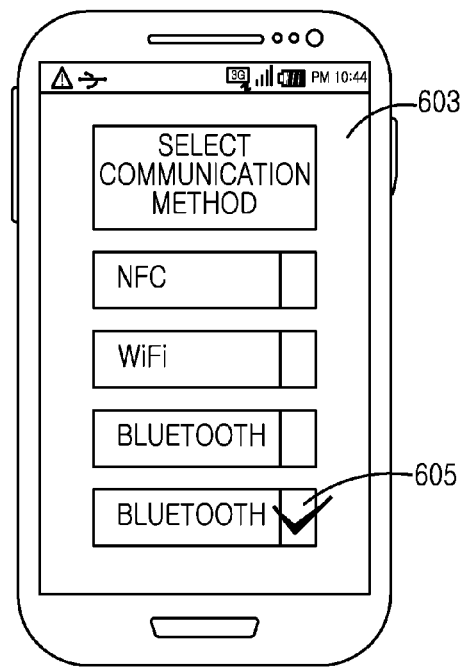

FIG. 6B illustrates a displayed menu 603 including items for Bluetooth communication, WiFi communication, and NFC communication, and an item for automatically selecting the communication method. As described above, a communication method used for connecting with another electronic device can be either determined by a user, e.g., using the menu 603, or be determined by the electronic device.

When the item for automatically selecting the communication method is selected, the electronic device can determine an available communication method in negotiation with the another electronic device.

As illustrated in FIG. 6B, a selection 605 of the item Bluetooth communication is selected as the communication method.

Figure 6C:
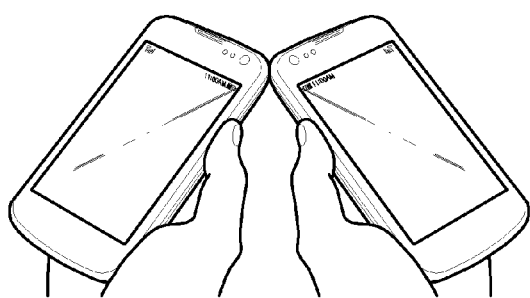
Figure 6D:
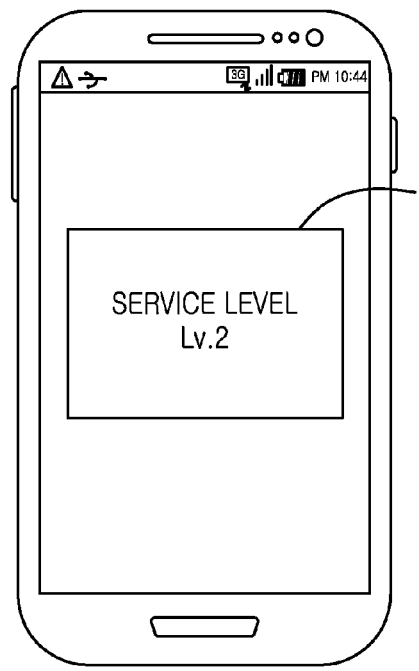

After the electronic device defines the communication method, as described above, and is tagged by (or tags) the another electronic device, as illustrated in FIG. 6C, the electronic device updates a service level 607 of the tagged electronic device, as illustrated in FIG. 6D.

Figure 7A:
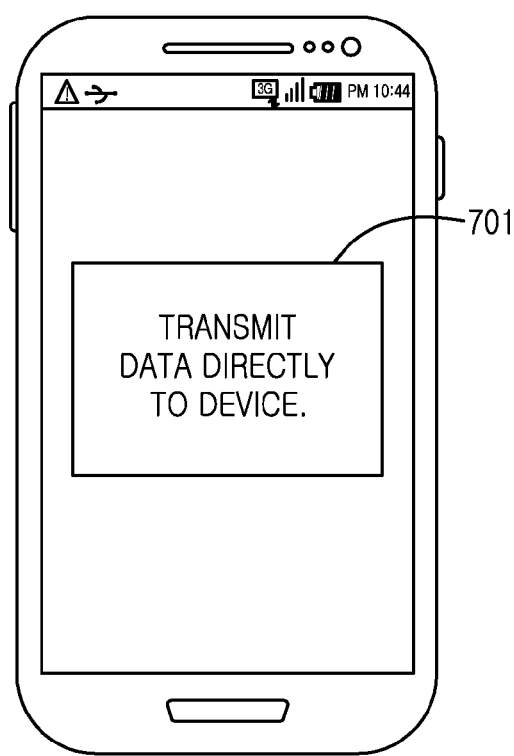
FIGS. 7A and 7B illustrate examples of screens that are displayed in an electronic device according to embodiments of the present invention.
Figure 7B:
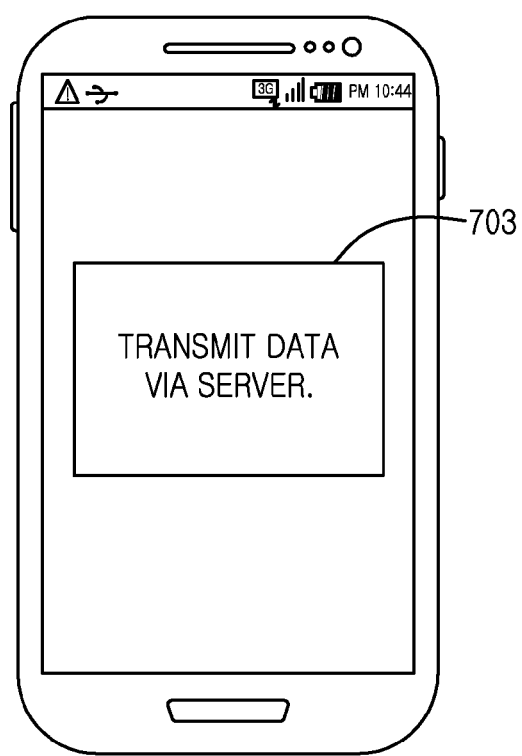

FIGS. 7A and 7B illustrate examples of screens that are displayed in an electronic device according to embodiments of the present invention.

Referring to FIG. 7A, the electronic device displays an indicator 701, when determining to transmit data directly to the tagged device, e.g., as illustrated in step 505 of FIG. 5.

Alternatively, referring to FIG. 7B, the electronic device displays an indicator 703, when determining to transmit data to the tagged device via the server, e.g., as illustrated in step 507 of FIG. 5.

Figure 8:
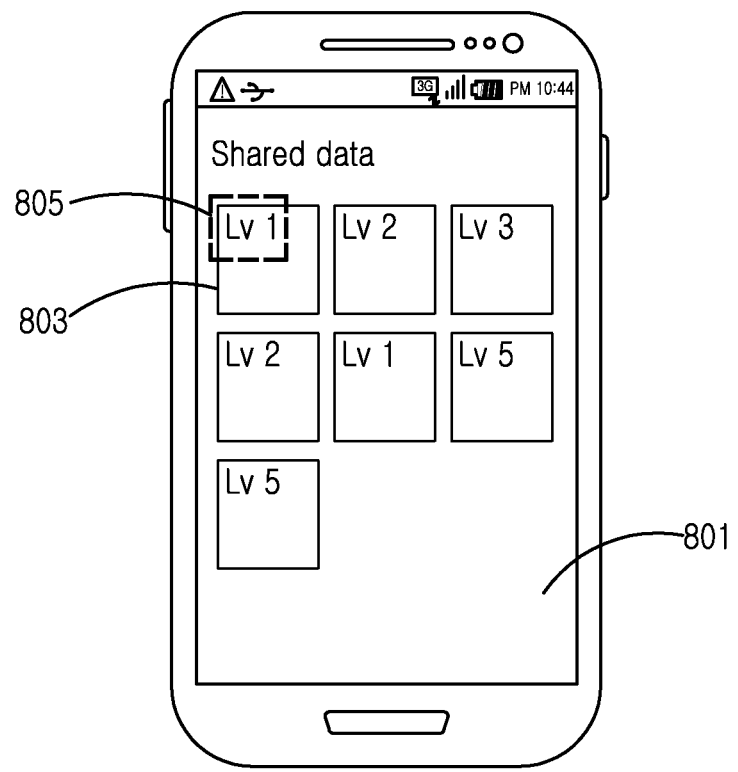
FIG. 8 illustrates a process of setting a level of shared data in an electronic device according to an embodiment of the present invention.

FIG. 8 illustrates a process of setting a level of shared data in an electronic device according to an embodiment of the present invention.

Referring to FIG. 8, the electronic device can set a level of data through a data edit menu. Further, the electronic device displays information 805 about levels that are set to shared data 803 displayed. Specifically, FIG. 8 illustrates a screen 801 of an electronic device displaying the shared data set to levels 1 (Lv1) to 5 (Lv5). For example, the level 1 (Lv1) is a level of a highest importance and the level 5 (Lv5) is a level of a lowest importance.

As described above, the electronic device will only share data corresponding to a service level of a tagged electronic device. For example, if the service level of the tagged electronic device is Lv2, the electronic device only shares data set to Lv2 among the shared data with the tagged electronic device.

Alternatively, the electronic device may share data of an equal or lower level than a service level of a tagged electronic device.

For example, if the service level of the tagged electronic device is Lv2, the electronic device can share data corresponding to Lv2, Lv3, Lv4, and Lv5 among the shared data with the tagged electronic device.

FIGS. 9A, 9B and 9C illustrate examples of screens that are displayed in an electronic device while setting a level of shared data according to an embodiment of the present invention.

Referring to FIG. 9A, a service level may be set according to the content of data to be shared. More specifically, FIG. 9A illustrates setting a service level to different types of information among personal profile information 901. FIG. 9A illustrates information to which a service level is set as lock information 903. The lock information to which the service level is set as above can be shared with a tagged electronic device satisfying the set service level. That is, if the electronic device identifies a service level of a tagged electronic device and then determines that the identified service level is not a service level capable of sharing the lock information, the electronic device can provide personal profile information, except for the lock information, to the tagged electronic device.

Further, if the electronic device identifies the service level of the tagged electronic device and then determines that the identified service level is capable of sharing the lock information, the electronic device provides all of the personal profile information to the tagged electronic device.

The tagged electronic device illustrated in FIG. 9B, which receives the personal profile information including the lock information from the electronic device illustrated in FIG. 9A, displays lock information 907 and unlock information (basic and detailed information) 905.

Further, the electronic device can provide a service level of a tagged electronic device and its own service level information as lock information. That is, as illustrated in FIG. 9C, the electronic device can provide a service level 911 of a user and a service level situation 913 of the user as lock information.

In FIG. 9C, the service level information of the user provided as the lock information represents a service level that is updated according to the number of tagging operations between the electronic device and the tagged electronic device and a tagging frequency.

Further, the service level situation 913 provides information about tagging order between users, order changes, etc., during a predetermined period of time.

The electronic device can determine a service level of another electronic device for data sharing in a tagging method, identify data according to the service level of the electronic device, and share the identified data with the tagged electronic device.

It will be appreciated that various embodiments of the present invention can be realized in the form of hardware, software, or a combination of hardware and software. Any such software may be stored in a non-transitory computer readable storage medium. The non-transitory computer readable storage medium stores one or more programs (software modules). The one or more programs include instructions, which when executed by one or more processors in an electronic device, cause the electronic device to perform methods of the present invention. Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), a digital Versatile Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been shown and described with reference to certain embodiments thereof, it will be understood by those skilled in the art that various changes in form and details may be made therein without departing from the spirit and scope of the invention as defined by the appended claims and any equivalents thereof.

What is claimed is:

1. An electronic device comprising:
   a processor; and
   a memory for storing program instructions, the program instructions configured to have the processor perform the steps of:
   sensing a tagging with another electronic device;
   determining a service level of the another electronic device, wherein the service level is granted a different weight based on an acquaintance relationship between a user of the electronic device and a user of the another electronic device;
   identifying shared data corresponding to the determined service level of the another electronic device; and
   transmitting the identified shared data to the another electronic device,
   wherein the service level of the another electronic device is set and updated according to a number of times the another electronic device is tagged.

2. The electronic device of claim 1, wherein sensing the tagging with the another electronic device comprises determining that the electronic device has made physical contact with the another electronic device.

3. The electronic device of claim 1, wherein sensing the tagging with the another electronic device comprises determining that the electronic device is within a predetermined distance of the another electronic device.

4. The electronic device of claim 1, wherein determining the service level of the another electronic device comprises granting a weight to at least one of tagging frequency information of the another electronic device, tagging period information, and tagging position information.

5. The electronic device of claim 1, further comprising connecting with the another electronic device using one of Near Field Communication (NFC), Bluetooth, and Wireless Fidelity (WiFi).

6. The electronic device of claim 1, further comprising determining a shared data transmission method based on at least one of a size of the identified shared data and an importance of the identified shared data,
wherein the determined shared data transmission method includes one of direct transmission to the another electronic device and indirect transmission to the another electronic device via a server.

7. The electronic device of claim 1, further comprising setting a level to the shared data.

8. The electronic device of claim 1, wherein determining the service level of the another electronic device comprises receiving the service level from a server that manages transmission of the shared data.

9. The electronic device of claim 1, further comprising receiving shared data from the another electronic device.

10. A method of sharing data by an electronic device, the method comprising the steps of:
sensing a tagging of the electronic device with another electronic device;
determining a service level of the another electronic device, wherein the service level is granted a different weight based on an acquaintance relationship between a user of the electronic device and a user of the another electronic device;
identifying shared data corresponding to the determined service level of the another electronic device; and
transmitting the identified shared data to the another electronic device,
wherein the service level of the another electronic device is set and updated according to a number of times the another electronic device is tagged.

11. The method of claim 10, wherein sensing the tagging of the electronic device with the another electronic device comprises determining that the electronic device has made physical contact with the another electronic device.

12. The method of claim 10, wherein sensing the tagging of the electronic device with the another electronic device comprises determining that the electronic device is within a predetermined distance of the another electronic device.

13. The method of claim 10, wherein determining the service level of the another electronic device comprises granting a weight to at least one of tagging frequency information of the another electronic device, tagging period information, and tagging position information.

14. The method of claim 10, further comprising connecting with the another electronic device using one of Near Field Communication (NFC), Bluetooth, and Wireless Fidelity (WiFi).

15. The method of claim 10, further comprising determining a shared data transmission method based on at least one of a size of the identified shared data and an importance of the identified shared data,
wherein the determined shared data transmission method includes one of direct transmission to the another electronic device and indirect transmission to the another electronic device via a server.

16. The method of claim 10, further comprising setting a level to the shared data.

17. The method of claim 10, wherein determining the service level of the another electronic device comprises receiving the service level from a server that manages transmission of the shared data.

18. The method of claim 10, further comprising receiving shared data from the another electronic device.

19. A non-transitory computer-readable storage medium recording a program thereon, which when executed by an electronic device, controls the electronic device to perform a method comprising:
sensing a tagging of the electronic device with another electronic device;
determining a service level of the another electronic device, wherein the service level is granted a different weight based on an acquaintance relationship between a user of the electronic device and a user of the another electronic device;
identifying shared data corresponding to the determined service level of the another electronic device; and
transmitting the identified shared data to the another electronic device,
wherein the service level of the another electronic device is set and updated according to a number of times the another electronic device is tagged.

* * * * *